(12) United States Patent
Lee

(10) Patent No.: US 10,696,193 B2
(45) Date of Patent: Jun. 30, 2020

(54) EZ MAX HANDLE

(71) Applicant: Austin Jihoon Lee, Orange, CA (US)

(72) Inventor: Austin Jihoon Lee, Orange, CA (US)

( * ) Notice: Subject to any disclaimer, the term of this patent is extended or adjusted under 35 U.S.C. 154(b) by 0 days.

(21) Appl. No.: 16/375,822

(22) Filed: Apr. 4, 2019

(65) Prior Publication Data

US 2019/0308530 A1    Oct. 10, 2019

Related U.S. Application Data

(60) Provisional application No. 62/654,510, filed on Apr. 8, 2018.

(51) Int. Cl.
*B60N 2/26* (2006.01)
*B60N 2/28* (2006.01)
*A47D 13/02* (2006.01)

(52) U.S. Cl.
CPC ......... *B60N 2/2845* (2013.01); *B60N 2/2821* (2013.01); *A47D 13/025* (2013.01)

(58) Field of Classification Search
CPC ............................ B60N 2/2821; B60N 2/2845
USPC ...................... 297/183.1, 183.2, 183.3, 183.4
See application file for complete search history.

(56) References Cited

U.S. PATENT DOCUMENTS

| | | | | |
|---|---|---|---|---|
| 5,207,476 A * | 5/1993 | Payne | ..... | A47D 13/02 297/183.3 X |
| 5,544,935 A * | 8/1996 | Cone, II | ..... | A47D 13/02 297/183.2 X |
| 5,651,581 A * | 7/1997 | Myers | ..... | A47D 13/02 297/183.1 X |
| 5,806,924 A * | 9/1998 | Gonas | ..... | B60N 2/2821 297/183.6 X |
| 6,017,088 A * | 1/2000 | Stephens | ..... | A47D 13/02 292/50 |
| 6,626,493 B2 * | 9/2003 | Kain | ..... | B60N 2/2812 297/250.1 |
| 6,688,685 B2 * | 2/2004 | Kain | ..... | B60N 2/2812 297/250.1 |
| 6,913,313 B2 * | 7/2005 | Sedlack | ..... | A47D 13/02 297/183.1 |
| 7,338,122 B2 * | 3/2008 | Hei | ..... | B60N 2/2806 297/256.12 |
| 7,918,499 B2 * | 4/2011 | Tuckey | ..... | A47D 13/105 297/183.2 |
| 8,033,599 B2 * | 10/2011 | Meeker | ..... | A47D 13/02 297/183.3 X |
| 8,220,870 B2 * | 7/2012 | Omar | ..... | B60N 2/2845 297/250.1 X |
| 8,684,454 B2 * | 4/2014 | Chipman | ..... | A47D 13/025 297/183.2 |
| 2002/0163232 A1 * | 11/2002 | Vezinet | ..... | B60N 2/2821 297/183.2 X |

(Continued)

FOREIGN PATENT DOCUMENTS

EP          1157880 A1 * 11/2001  ........... B60N 2/2821

*Primary Examiner* — Rodney B White
(74) *Attorney, Agent, or Firm* — Ahmadshahi & Associates

(57) ABSTRACT

A child seat comprises a transport shell and a handle coupled to the sides of the shell. The handle, includes an arm support and a hand grip with holes where a user's hand may pass through to ergonomically transport the seat. A second arm support and a second hand grip with holes may be implemented in the handle so as to allow the user to use his or her right-hand or left-hand to carry the seat.

20 Claims, 5 Drawing Sheets

(56) References Cited

U.S. PATENT DOCUMENTS

| | | | |
|---|---|---|---|
| 2003/0164631 A1* | 9/2003 | Sedlack | B62B 9/245 |
| | | | 297/250.1 |
| 2004/0124674 A1* | 7/2004 | Birchfield | B60N 2/2845 |
| | | | 297/130 |
| 2005/0253349 A1* | 11/2005 | Birchfield | B60N 2/2845 |
| | | | 280/30 |
| 2011/0266767 A1* | 11/2011 | Bao | B62K 9/00 |
| | | | 297/183.1 X |
| 2013/0043706 A1* | 2/2013 | Gaudreau, Jr. | B60N 2/2821 |
| | | | 297/256.13 |

* cited by examiner

EZ MAX HANDLE

CROSS REFERENCE TO RELATED APPLICATIONS

The present patent application is a formalization of a previously filed co-pending provisional patent application entitled "EZ MAX HANDLE," filed on Apr. 8, 2018, as U.S. patent application Ser. No. 62/654,510 by the inventor(s) named in this application. This patent application claims the benefit of the filing date of the cited provisional patent application according to the statutes and rules governing provisional patent applications, particularly 35 USC § 119 and 37 CFR § 1.78. The specification and drawings of the cited provisional patent application are specifically incorporated herein by reference.

COPYRIGHT

A portion of the disclosure of this patent document contains material which is subject to copyright protection. The owner has no objection to the facsimile reproduction by anyone of the patent disclosure, as it appears in the Patent and Trademark Office files or records, but otherwise reserves all copyright rights whatsoever.

FIELD OF INVENTION

The present invention relates to child seat comprising a transport shell and a handle which makes it comfortable for the user to transport the child in the child seat. In particular, the handle comprises at least an aim support and a hand grip with holes to receive the user's arm and hand. The handle, so configured, operates to relieve the bending moment that would otherwise be exerted on the user associated with conventional child seats.

BACKGROUND

Child seats or child safety seats are ordinarily used in a vehicle when a child is aboard the vehicle. Adults are required to use child seats when transporting the child. Throughout the U.S., it is required to secure the child in such child seats.

Conventional child seats have handles. Often, the user transports the seat, via the handle, with the child secured inside the seat. In addition to supporting the vertical force associated with the weight of the child, the user is subjected to a bending moment which makes it difficult to transport the child for even short distances, say from home to the car which is parked on the driveway.

With conventional child seats, the user grips the handle from the center of its top section to stabilize the seat so as to avoid tipping the child seat over with the child secured inside it. The aforementioned bending moment is exerted upon the user while his or her hand is stretched outwardly away from his or her body. This is an awkward position for the user to transport the child. The user would prefer to carry the child while his or her hand is in an unstretched position and along the length of his or her body, see for instance, FIG. 1 below. Therefore, there is a need for a child seat where the vertical and bending loads are supported by an ergonomically designed handle.

SUMMARY

In one aspect, a child seat is disclosed wherein the child seat comprises a transport shell configured to receive the child, said shell comprising a first side portion and a second side portion and a handle which comprises a first section coupled with the first side portion, a second section coupled with the second side portion, a third section substantially perpendicular to the first section and the second section and disposed between the first section and the second section, a fourth section disposed between the first section and the third section, a fifth section disposed between the second section and the third section, a first arm support disposed along the fourth section, and a first hand grip disposed along the first section, wherein the first arm support comprises a first hole configured to receive an arm of a user who transports the child seat, and wherein the first hand grip comprises a second hole configured to receive a hand of the user.

Preferably, the first section is rotatably coupled with the first side portion and the second section is rotatably coupled with the second side portion.

Preferably, the first arm support is disposed substantially at the center point along the fourth section.

Preferably, the first hand grip is disposed substantially at one end of the first section.

Preferably, the first section and the second section are substantially straight.

Preferably, the fourth section and the fifth section are substantially curved.

Preferably, the first hole is substantially circular and the second hole is substantially elliptical.

Preferably, the child seat further comprises a second arm support disposed along the fifth section and a second hand grip disposed along the second section, wherein the second arm support comprises a third hole configured to receive the other arm of the user, and wherein the second hand grip comprises a fourth hole configured to receive the other hand of the user. Preferably, the second arm support is disposed substantially at the center point along the fifth section. Preferably, the second hand grip is disposed substantially at one end of the second section.

In another aspect, a handle is disclosed in combination with a child seat, wherein the child seat comprises a transport shell configured to receive the child, said shell comprising a first side portion and a second side portion, said handle, comprising a first section coupled with the first side portion, a second section coupled with the second side portion, a third section substantially perpendicular to the first section, and the second section and disposed between the first section and the second section, a fourth section disposed between the first section and the third section, a fifth section disposed between the second section and the third section, a first arm support disposed along the fourth section, and a first hand grip disposed along the first section, wherein the first arm support comprises a first hole configured to receive an arm of a user who transports the child seat, and wherein the first hand grip comprises a second hole configured to receive a hand of the user.

Preferably, the first section is rotatably coupled with the first side portion and the second section is rotatably coupled with the second side portion.

Preferably, the first arm support is disposed substantially at the center point along the fourth section.

Preferably, the first hand grip is disposed substantially at one end of the first section.

Preferably, the handle further comprises a second at arm support disposed along the fifth section and a second hand grip disposed along the second section, wherein the second arm support comprises a third hole configured to receive the other arm of the user, and wherein the second hand grip comprises a fourth hole configured to receive the other hand of the user. Preferably, the second arm support is disposed substantially at the center point along the fifth section. Preferably, the second hand grip is disposed substantially at one end of the second section.

In another aspect, a method of transporting a child is disclosed wherein the method comprises providing a handle in combination with a child seat, said child seat comprising a transport shell configured to receive the child, said shell comprising a first side portion and a second side portion, said handle comprising a first section coupled with the first side portion, a second section coupled with the second side portion, a third section substantially perpendicular to the first section and the second section and disposed between the first section and the second section, a fourth section disposed between the first section and the third section, a fifth section disposed between the second section and the third section, a first arm support disposed along the fourth section, and a first hand grip disposed along the first section, wherein the first arm support comprises a first hole configured to receive an arm of a user who transports the child seat, and wherein the first hand grip comprises a second, hole configured to receive a hand of the user.

Preferably, the first section is rotatably coupled with the first side portion and the second section is rotatably coupled with the second side portion.

Preferably, the handle further comprises a second arm support disposed along the fifth section and a second hand grip disposed along the second section, wherein the second arm support comprises a third hole configured to receive the other arm of the user, and wherein the second hand grip comprises a fourth hole configured to receive the other hand of the user.

DETAILED DESCRIPTION OF THE PRESENTLY PREFERRED EMBODIMENTS

Figure 1:
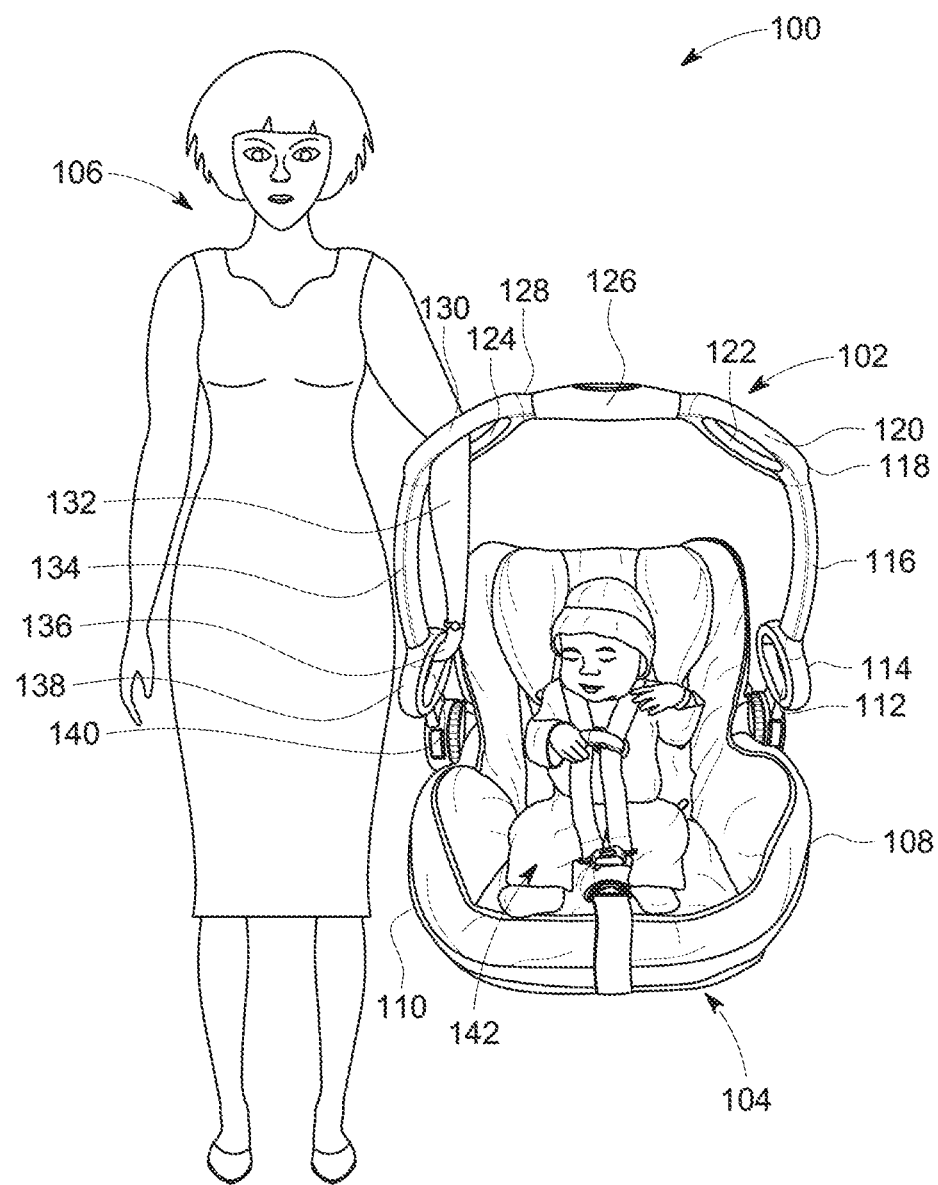
FIG. 1 shows a front perspective, view of a preferred embodiment of a child seat being held by a user, the seat comprising a transport shell and a handle which includes two arm supports and two hand grips having holes for the user to comfortably carry the seat with a child secured inside the seat.

FIG. 1A depicts a front perspective view of a preferred embodiment of a child seat 100 being held by a user 106. The seat comprises a transport shell 104 and a handle 102 which includes two arm supports 130 and 120, and two hand grips 138 and 114. The first arm support 130 comprises a first hole 124 and the first hand grip 138 comprises a second hole 140. The second arm support 120 comprises a third hole 122 and the second hand grip comprises a fourth hole 112. The arm supports 130 and 120 and the hand grips 138 and 114 provide means for the user 106 to comfortably carry the seat 100 with a child 142 secured inside the seat 100 using either the left hand or the right hand. In particular, the user 106 may pass his or her hand through the first hole 124 and the second hole 140 to comfortably carry the set 100 and avoid the bending moment that would otherwise exist if the user 106 held the seat 100 using his or her hand 136 to hold the third section (shown in more detail in FIG. 3) of the handle 102.

The shell 104 comprises a first side portion 110 and a second side portion 108. The handle 102 comprises five sections (shown in more detail in FIG. 3) designated as first section, second section, third section, fourth section, and fifth section. In a preferred embodiment, the handle 102 is a one-piece component which is made from plastic material and constructed utilizing an injection molding process or 3-D printing, known to artisans of ordinary skill, to manufacture the handle 102.

In a preferred embodiment, the handle 102 is a one-piece component that comprises five sections. A first section of the handle 102 comprises the first hand grip 138. A second section of the handle 102 comprises the second hand grip 114. A third section 126 of the handle 102 is substantially perpendicular the first section and the second section. A fourth section of the handle 102 comprises the first arm support 130. A fifth section of the handle 102 comprises the second arm support 120.

Figure 2A:
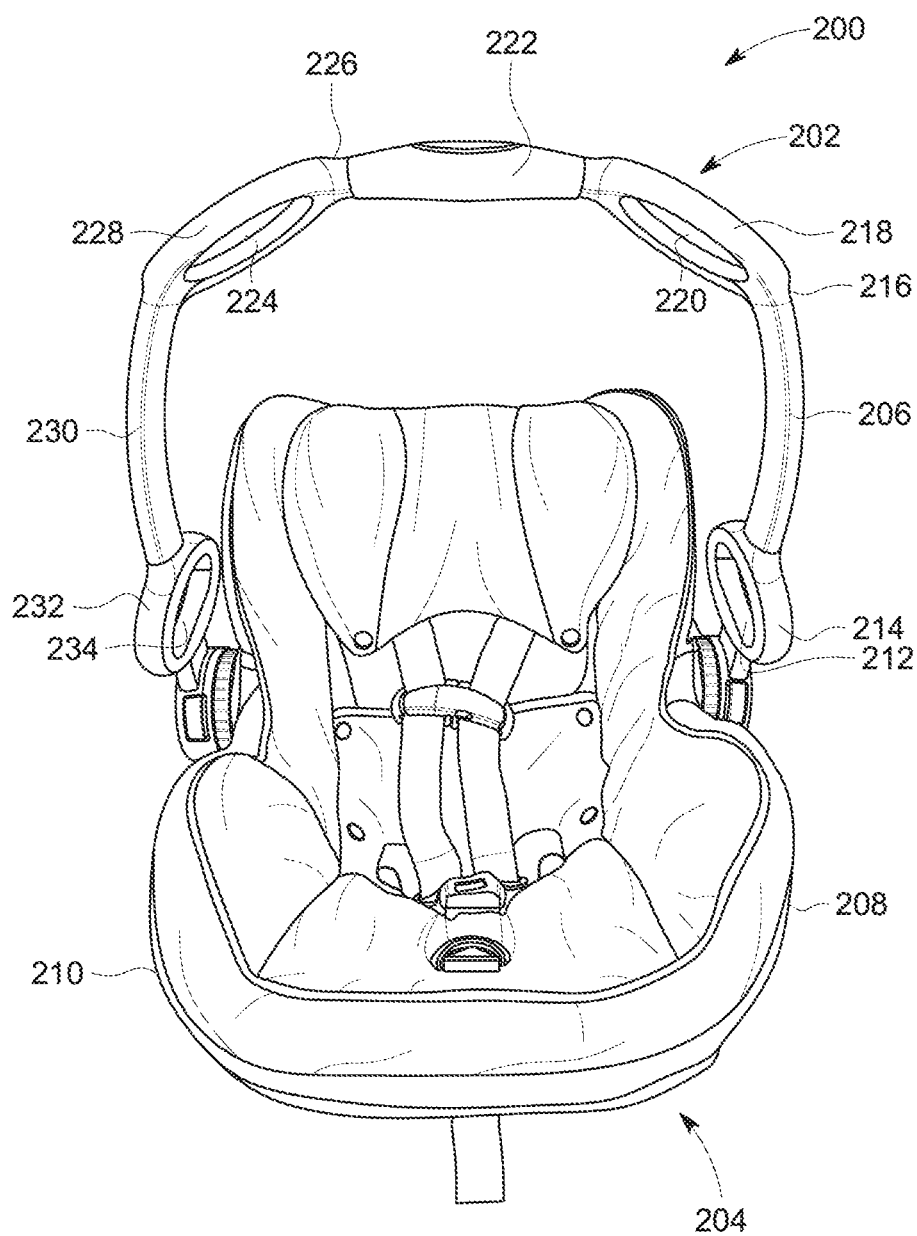
FIG. 2A shows a front perspective view of a preferred embodiment of a child seat illustrating the handle having two substantially straight vertical sections, a horizontal section perpendicular to the vertical sections, and two substantially curved sections. The arm supports are disposed substantially at the center point of the curved sections and the hand grips are disposed substantially at the bottom end of the vertical sections.

FIG. 2A depicts a front perspective view of a preferred embodiment of a child seat 200. The child seat 200 comprises a handle 202 and a transport shell 204. The transport shell 204 is utilized to transport a child (not shown). The seat 200 provides means to eliminate or substantially reduce the bending moment that the seat 200 would otherwise produce due to the weight of the child. Specifically, the handle 202 includes a first arm support 228 and a first hand grip 232 which can be utilized to carry the seat 200 in a manner so as to avoid imparting bending loads on the individual who is transporting the child.

The transport shell 204 has a seating portion within which the child is, secured. The shell 204 includes a first side portion 210 and a second side portion 208 to which the handle 202 is coupled. The handle 202 is designated so as to include five sections, a first section, a second section, a third section, a fourth section, and a fifth section (see for instance FIG. 3). These five sections are so designated for purposes of clarity and in this preferred embodiment, the handle 202 is manufactured as a one-piece component utilizing the injection molding process, known to artisans of ordinary skill. In another preferred embodiment, the aforementioned five sections could be constructed separately and subsequently coupled together to arrive at the final configuration such as the one shown as the handle 202.

In a preferred embodiment, the first section is substantially straight and comprises a first hand grip 232. The second section is substantially straight and comprises a second hand grip 214. The third section 222 is disposed between the first section and the second section and is perpendicular to said sections. The fourth section is substantially curved and comprises a first arm support 228. The fifth section is also substantially curved and comprises a second arm support 218. The first arm support 228 has a first hole 224. The first hand 232 grip has a second hole 234. The second arm support 218 has a third hole 220. The second hand grip 214 has a fourth hole 212. The first hole 224 of the first arm support 228 and the second hole 234 of the first hand grip 232 can be utilized by a user such as the user 106 shown in FIG. 1 to insert her arm 132 and hand 136 through the first hole 224 and the second hole 234

As can be seen in this preferred embodiment, the first section and the second section, including the first hand grip 232 and the second hand grip 214 are mirror images of each other and are symmetrically disposed about a vertical axis passing through the center point of the seat 200. Similarly, the fourth section and the fifth section, including the first arm support 228 and the second arm support 218 are mirror images of each other and are symmetrically disposed about the vertical axis of the seat 200. Furthermore, as can be seen in this preferred embodiment, the first arm support 228 is disposed substantially at the center point of the fourth section, the first hand grip 232 is disposed at the bottom end of the first section, the second arm support 218 is disposed substantially at the center point of the fifth section, and the second hand grip 214 is disposed substantially at the bottom end of the second section.

Figure 2B:
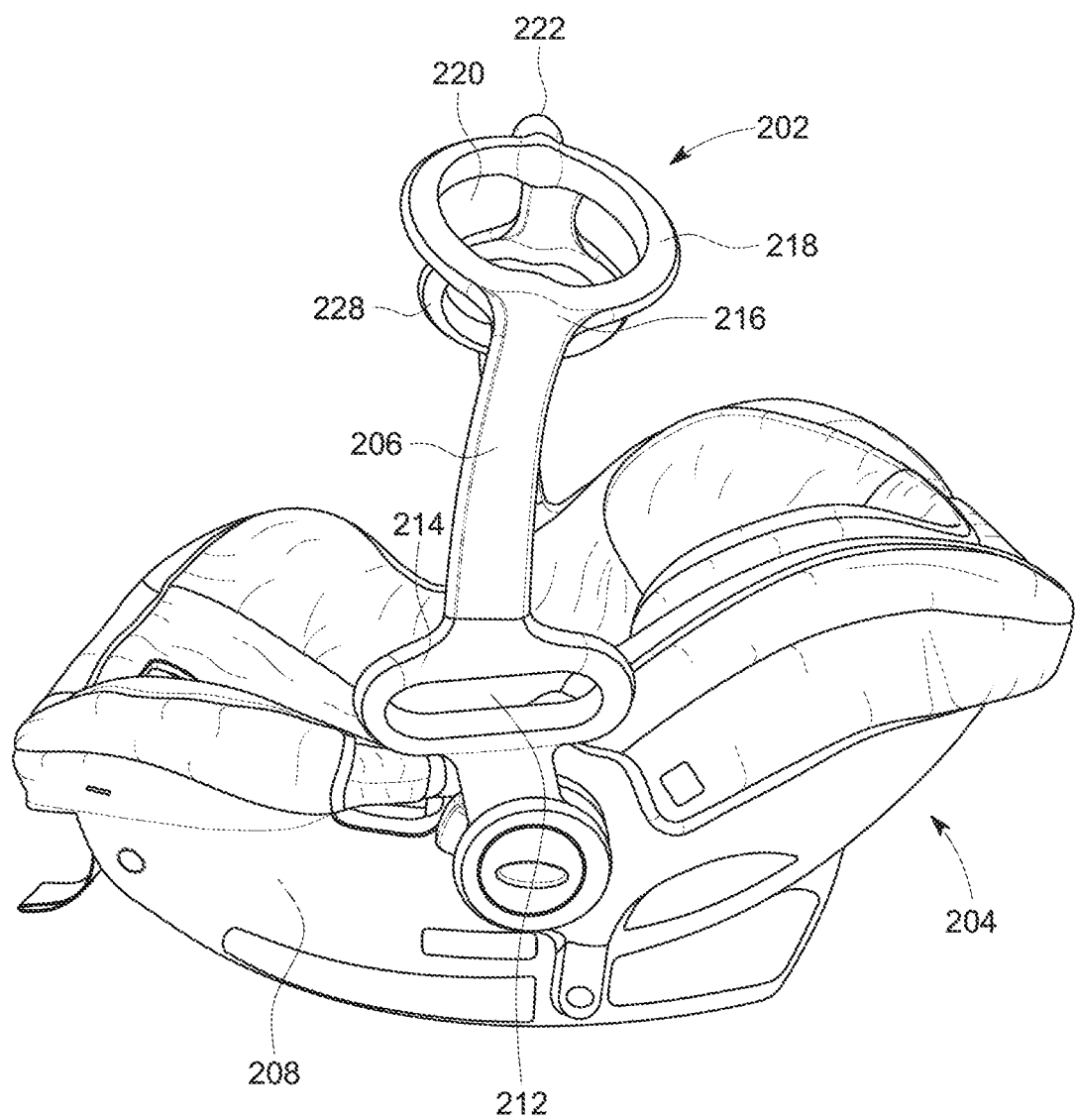
FIG. 2B shows a side perspective view of the child seat shown in FIG. 2A further illustrating how the handle is coupled with one side portion of the transport shell and the relative positions of the arm supports and the hand grips with respect to the transport shell.

FIG. 2B depicts a side perspective view of the child seat 200, shown in FIG. 2A, comprising the transport shell 204 and the handle 202. This figure further illustrates how the handle 202 is coupled with the second side portion 208 of the transport shell 204 and the relative positions of the arm supports 218 and 228 and hand grips 214 and 232 (not visible) with respect to the transport shell 204.

In this preferred embodiment, the second arm support 218 and its hole 220, and the first arm support 228 (partially visible) and its hole 224 (partially visible) are substantially circular. The second arm grip 214 and its hole 212, and the first arm grip 232 (not visible) and its hole 234 (not visible) are substantially elliptical.

Figure 2C:
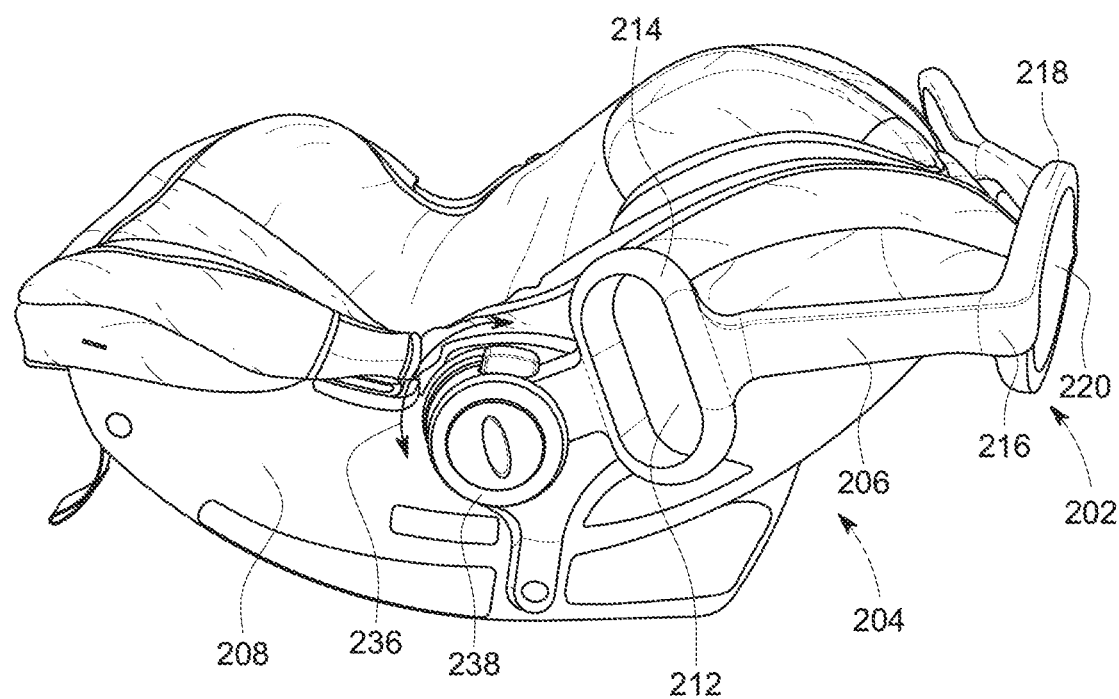
FIG. 2C shows a side perspective view of the child seat shown in FIG. 2B where the handle is rotated counterclockwise, with respect to an axis normal to the plain of the figure, to rest in a horizontal position.

FIG. 2C depicts a side perspective view of the child seat 200, shown in FIG. 2A, comprising the transport shell 204 and the handle 202 where the handle 202 is rotated clockwise, with respect to an axis normal to the plain of the figure, to rest in a horizontal position. A coupler 238 which may be a separate component or an integral section of the handle 202 can rotate in both clockwise and counterclockwise at 236 to position the handle 202 at different angles of inclination. Furthermore, the coupler 238 provides means to lock the handle 202 at different angles of inclination. The coupler 238 and another on the other side (not visible) rotatably couples the handle 202 with the first side portion (not visible) and the second side portion 208 of the seat 204.

Figure 3:
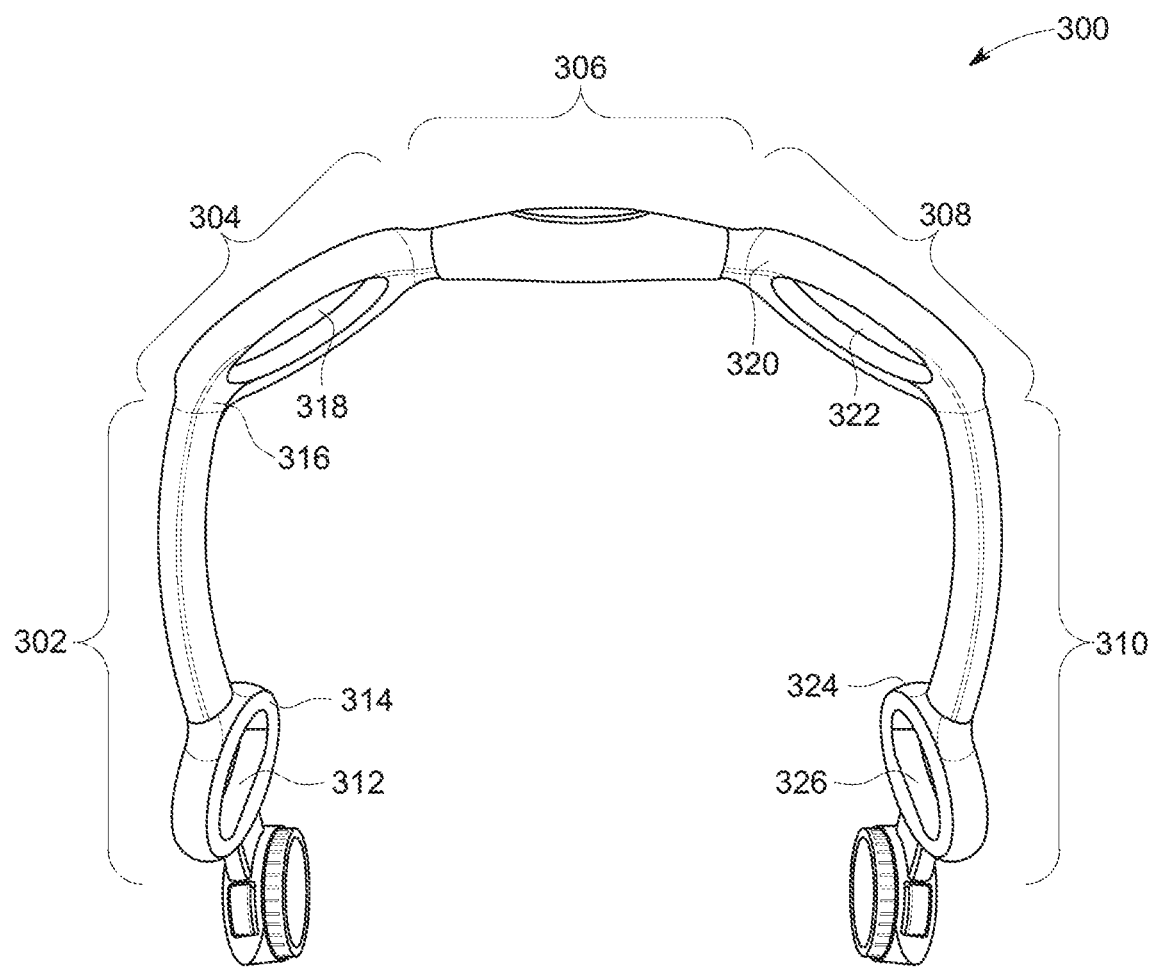
FIG. 3 shows a front perspective view of a preferred embodiment of a handle in combination with a child seat, the handle having two substantially vertical straight sections, a horizontal section perpendicular to the vertical sections, and two substantially curved sections. The arm supports are disposed substantially at the center point of the curved sections and the hand grips are disposed substantially at the bottom end of the vertical sections. Two coupling mechanisms couple the handle to the side portions of the transport shell of the child seat.

FIG. 3 depicts a front perspective view of a preferred embodiment of a handle 300 in combination with a child seat, such as the child seat 200 shown in FIG. 2A through FIG. 2C. In this figure, five sections of the handle 300 are shown to illustrate the positions of the arms supports and the hand grips discussed above. In particular, the handle 300 comprises a first section 302, a second section 310, a third section 306, a fourth section 304, and a fifth section 308.

According to this preferred embodiment, the first section 302 and the second section 310 are substantially vertical and straight. In an alternative embodiment, the first section 302 and the second section 310 may be configured to have different shapes, such as concave or convex configuration. The third section 306 is straight and disposed between the first section 302 and the second section 310 and is perpendicular to them.

The fourth section 304 is between the first section 302 and the third section 306. The fifth section 308 is between the second section 310 and the third section 306. According to this preferred embodiment, the fourth section 304 and the fifth section 308 are substantially curved but can be configured to have different shapes, such as planar.

The fourth section 304 comprises a first arm support 316. The fifth section 308 comprises a second arm support 320. The first section 302 comprises a first hand grip 314. The second section 310 comprises a second hand grip 326. The first arm support 316 comprises a first hole 318 and the first hand grip 314 comprises a second hole 312. The second arm support 320 comprises a third hole 322 and the second hand grip 324 comprises a fourth hole 326. According to his preferred embodiment, the first hole 318 is disposed substantially at the center point along the fourth section 304, the second hole 312 is disposed substantially at one end of the first section 302, the third hole 322 is disposed substantially at the center point along the fifth section 308, and the fourth hole 326 is disposed substantially at one end of the second section 310.

In one embodiment, the handle 300 comprises only the first arm support 316 and the first hand grip 314 without the second arm support 308 and the second hand grip 324. By incorporating the two arm supports 316 and 320 and the two hand grips 314 and 324, a user may carry the child using her right hand or left hand and further be facing the child or having the child's face in the same direction as her face.

The foregoing explanations, descriptions, illustrations, examples, and discussions have been set forth to assist the reader with understanding this invention and further to demonstrate the utility and novelty of it and are by no means restrictive of the scope of the invention. It is the following claims, including all equivalents, which are intended to define the scope of this invention.

What is claimed is:

1. A child seat, comprising:
   (a) a transport shell configured to receive the child, said shell comprising a first side portion and a second side portion; and
   (b) a handle, comprising:
   (i) a first section coupled with the first side portion;
   (ii) a second section coupled with the second side portion;
   (iii) a third section substantially perpendicular to the first section and the second section and disposed between the first section and the second section;
   (iv) a fourth section disposed between the first section and the third section;
   (v) a fifth section disposed between the second section and the third section;
   (vi) a first arm support disposed along the fourth section; and
   (vii) a first hand grip disposed along the first section;
   wherein the first arm support comprises a first hole configured to receive an arm of a user who transports the child seat; and wherein the first hand grip comprises a second hole configured to receive a hand of the user.

2. The child seat of claim 1, wherein the first section is rotatably coupled with the first side portion and the second section is rotatably coupled with the second side portion.

3. The child seat of claim 1, wherein the first arm support is disposed substantially at the center point along the fourth section.

4. The child seat of claim 1, wherein the first hand grip is disposed substantially at one end of the first section.

5. The child seat of claim 1, wherein the first section and the second section are substantially straight.

6. The child seat of claim 1, wherein the fourth section and the fifth section are substantially curved.

7. The child seat of claim 1, wherein the first hole is substantially circular and the second hole is substantially elliptical.

8. The child seat of claim 1, further comprising:
(viii) a second arm support disposed along the fifth section and
(ix) a second hand grip disposed along the second section;
wherein the second arm support comprises a third hole, configured to receive the other arm of the user; and
wherein the second hand grip comprises a fourth hole configured to receive the other hand of the user.

9. The child seat of claim 8, wherein the second arm support is disposed substantially at the center point along the fifth section.

10. The child seat of claim 8, wherein the second hand grip is disposed substantially at one end of the second section.

11. A handle in combination with a child seat, said child seat comprising a transport shell configured to receive the child, said shell comprising a first side portion and a second side portion, said handle comprising:
(i) a first section coupled with the first side portion;
(ii) a second section coupled with the second side portion;
(iii) a third section substantially perpendicular to the first section an the second section and disposed between the first section and the second section;
(iv) a fourth section disposed between the first section and the third section;
(v) a fifth section disposed between the second section and the third section;
(vi) a first arm support disposed along the fourth section; and
(vii) a first hand grip disposed along the first section;
wherein the first arm support comprises a first hole configured to receive an arm of a user who transports the child seat; and
wherein the first hand grip comprises a second hole configured to receive a hand of the user.

12. The handle of claim 11, wherein the first section is rotatably coupled with the first side portion and the second section is rotatably coupled with the second side portion.

13. The handle of claim 11, wherein the first arm support is disposed substantially at the center point along the fourth section.

14. The handle of claim 11, wherein the first hand grip is disposed substantially at one end of the first section.

15. The handle of claim 11, further comprising:
(viii) a second arm support disposed along the fifth section; and
(ix) a second hand grip disposed along the second section;
wherein the second arm support comprises a third hole configured to receive the other arm of the user; and
wherein the second hand grip comprises a fourth hole configured to receive the other hand of the user.

16. The handle of claim 15, wherein the second arm support is disposed substantially at the center point along the fifth section.

17. The handle of claim 15, wherein the second hand grip is disposed substantially at one end of the second section.

18. A method of transporting a child, comprising:
(a) providing a handle in combination with a child seat, said child seat comprising a transport shell configured to receive the child, said shell comprising a first side portion and a second side portion, said handle comprising:
(i) a first section coupled with the first side portion;
(ii) a second section coupled with the second side portion;
(iii) a third section substantially perpendicular to the first section and the second section and disposed between the first section and the second section;
(iv) a fourth section disposed between the first section and the third section;
(v) a fifth section disposed between the second section and the third section;
(vi) a first arm support disposed along the fourth section; and
(vii) a first hand grip disposed along the first section;
wherein the first arm support comprises a first hole configured to receive an arm of a user who transports the child seat; and
wherein the first hand grip comprises a second hole configured to receive a hand of the user.

19. The method of claim 18, wherein the first section is rotatably coupled with the first side portion and the second section is rotatably coupled with the second side portion.

20. The method of claim 18, wherein the handle further comprises:
(viii) a second arm support disposed along the fifth section; and
(ix) a second hand grip disposed along the second section;
wherein the second arm support comprises a third hole configured to receive the other arm of the user; and
wherein the second hand grip comprises a fourth hole configured to receive the other hand of the user.

* * * * *